T. J. MELL.
BEAD FOR TIRE CASINGS.
APPLICATION FILED FEB. 5, 1916.
1,209,605.
Patented Dec. 19, 1916.
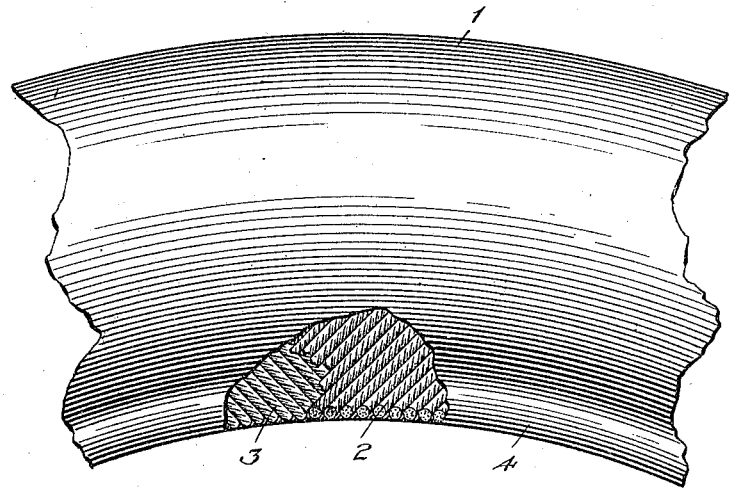
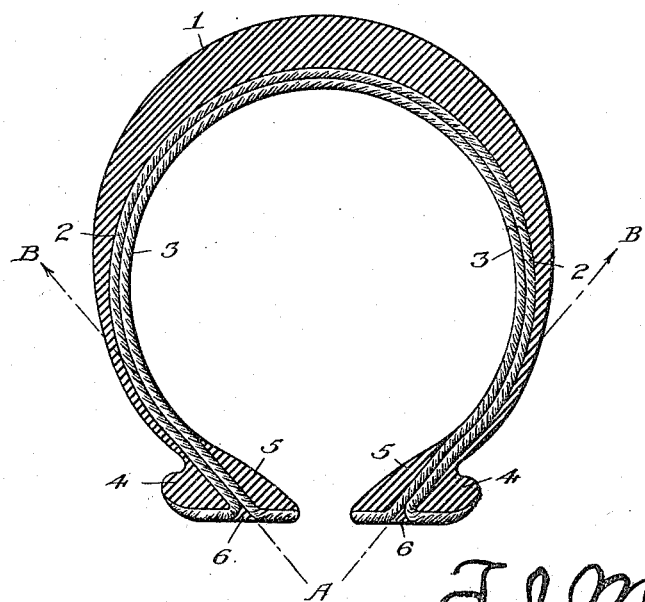

UNITED STATES PATENT OFFICE.

TOD J. MELL, OF YOUNGSTOWN, OHIO, ASSIGNOR TO THE REPUBLIC RUBBER COMPANY, OF YOUNGSTOWN, OHIO, A CORPORATION OF OHIO.

BEAD FOR TIRE-CASINGS.

1,209,605.      Specification of Letters Patent.      Patented Dec. 19, 1916.

Application filed February 5, 1916. Serial No. 76,388.

*To all whom it may concern:*

Be it known that I, TOD J. MELL, a citizen of the United States, residing at Youngstown, in the county of Mahoning and State of Ohio, have invented certain new and useful Improvements in Beads for Tire-Casings; and I do hereby declare the following to be a full, clear, and exact description of the invention, such as will enable others skilled in the art to which it appertains to make and use the same.

My present invention relates to tires for vehicle wheels, and more particularly to pneumatic tire-casings or outer shoes, and still more particularly to the beads which form part of such tire casings at the base and upon both sides thereof.

Primarily this invention has for an object the production of sectional or spliced tire-beads of non-stretchable material as distinguished from beads of unitary construction, and while applicable to casings or shoes wherein frictioned fabric is employed as the wear-resisting medium, is more especially designed for use in the construction of tire casings of the cord or thread wound type.

As a further object this invention contemplates the production of tire casings wherein the strain or pull of the individual cords of wear-resisting material entering into the construction of tire carcasses will be in substantially straight lines through the center of the bead members, rather than curved around the exterior surfaces as in tire-beads of ordinary unitary formation.

A further object is the production of tire casings wherein the bead members are more effectually secured in operative position than by any structural arrangement heretofore known.

With the foregoing and other objects and structural advantages in view, the present invention will be hereinafter particularly described, and then pointed out in the claims following.

In the accompanying drawings which form part of this application for Letters Patent and whereon like numerals indicate corresponding parts in both views: Figure 1 is a fragmentary view in side elevation, showing a tire casing partly broken away for the purpose of disclosing wear-resisting cords of which the carcass is in part composed, and, Fig. 2 is a transverse sectional view taken through a tire casing embodying the present invention.

Reference being had to the drawings and numerals thereon, 1 indicates the outer rubber surface of a tire casing or shoe, and 2, 3, underlying cords constituting the wear-resisting medium. The cords 2 and 3, as usual with this class of casings, are by preference first thoroughly impregnated with a rubber solution or cement, and then applied in the process of tire building to a suitable ring-core (not shown) one layer or series upon another, at an angle of forty-five degrees more or less, and in superposed layers or series crossing each other at substantially right angles as shown. The construction disclosed by the present drawings contemplates a two-ply tire, but obviously the plies may be multiplied indefinitely, and as thus far described no particular novelty is claimed for the structure.

Attaching beads of suitable cross-sectional form are provided at the base and upon both sides of the tire carcass. Ordinarily the wear-resisting material such as cords 2 and 3—or friction fabric when used—is materially weakened at the bead-attaching localities, by reason of the fact that such material, instead of continuing through the beads in straight lines, is turned almost at right angles in passing around the outer edges of such beads. In contradistinction to this the present invention provides for extending the wear-resisting material from the body of the tire carcass through the tire-beads in substantially straight lines, or in other words, directly in line with the pull or strain to which said material is subjected when in use.

With the latter object in view therefore, the present invention contemplates the production of what may be termed sectional or spliced tire-beads, each comprising an annular outer bead member 4, of a cross sectional form best suited to meet requirements of either clencher beads as shown, or straight side beads; an annular inner bead member 5, and an intermediate filler ring 6, all of rubber so compounded as to produce an exceedingly hard non-stretchable homogeneous tire-bead after the cluster has been assembled as shown, and finally vulcanized.

The process by which the present invention is manufactured is not herein claimed, but on the contrary forms the subject matter of a separate application for Letters Patent. However, as shown by Fig. 2, the wear-resisting cords 2 and 3 continuing in substantially straight lines from the body of casing pass centrally between and beneath the annular bead members 4 and 5, respectively, and are then disposed oppositely to find a secure anchorage, and assist in binding or splicing the said bead members and filler ring together.

When formed substantially as shown and described the tire carcass, including the improved sectional bead members 4, 5 and 6, is thereupon subjected to the usual process of vulcanization, which results in a complete and homogeneous structure, the purposes and functions whereof are too well understood to require more than passing comment. It may be noted, however, as is well understood by persons skilled in the art to which this invention relates, that the greatest strain or pull upon tire casings, occasioned by the internal air pressure, and also by the weight of a load resting upon their tread surfaces, is a radial outwardly diverging strain, such as indicated by dotted lines in Fig. 2 of the drawings from A to B. And it will also be noted in connection with the present structure, that such strain or pull is equally distributed between the several series of cords 2 and 3, or sheets of friction fabric when used, or other wear-resisting material, regardless of the number of plies, this pull and strain being effected in straight lines directly from the base of the bead members and base of the entire structure; as distinguished from ordinary casings wherein the wear-resisting material is divided and wrapped completely around the bead members, thus placing a circumferential crimp in its outer edges, and subjecting its inner edges to undue strain.

The invention being substantially as herein set forth, it should be understood that I do not limit myself to the particular arrangement and combination of parts shown and described, since these may be variously modified, changed and rearranged without in the least departing from the spirit of my invention, which Having been thus described, what I now claim and desire to secure by Letters Patent is:

1. A bead for tire casings bisected circumferentially by a wear resisting material the individual strands whereof are oppositely folded beneath the base of said bead.

2. A tire carcass including fastening beads at its base, in combination with suitable wear-resisting material extending from the body of said carcass through its fastening beads in substantially straight lines and terminating in oppositely disposed folds embracing the base of said beads.

3. A tire carcass including fastening beads comprising a cluster of parallel bead members, in combination with wear-resisting cords extending from the body of said carcass through its fastening beads in substantially straight lines and terminating in oppositely disposed cord strands embracing the base of said beads.

In testimony whereof I affix my signature, in presence of two subscribing witnesses.

TOD J. MELL.

Witnesses:
M. H. DANIELS,
A. BRILL.